US011238601B2

United States Patent
Guizilini et al.

(10) Patent No.: US 11,238,601 B2
(45) Date of Patent: Feb. 1, 2022

(54) MULTI-SCALE RECURRENT DECODER FOR MONOCULAR DEPTH ESTIMATION

(71) Applicant: TOYOTA RESEARCH INSTITUTE, INC., Los Altos, CA (US)

(72) Inventors: Vitor Guizilini, Santa Clara, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 30 days.

(21) Appl. No.: 16/899,425

(22) Filed: Jun. 11, 2020

(65) Prior Publication Data
US 2021/0390718 A1 Dec. 16, 2021

(51) Int. Cl.
*G06T 7/00* (2017.01)
*G06T 7/50* (2017.01)
*G06T 3/40* (2006.01)

(52) U.S. Cl.
CPC .............. *G06T 7/50* (2017.01); *G06T 3/4046* (2013.01); *G06T 2207/20081* (2013.01); *G06T 2207/20084* (2013.01); *G06T 2207/30252* (2013.01)

(58) Field of Classification Search
CPC ............ G06T 7/50; G06T 3/4046; G06T 2207/20081; G06T 2207/30252; G06T 2207/20084
See application file for complete search history.

(56) References Cited

U.S. PATENT DOCUMENTS

2019/0206026 A1* 7/2019 Vemulapalli ........... G06N 20/00
2019/0279383 A1* 9/2019 Angelova ................ G06T 7/55
2020/0265590 A1* 8/2020 Daniilidis ............ G06N 3/0454
(Continued)

FOREIGN PATENT DOCUMENTS

CN 110335299 A 10/2019

OTHER PUBLICATIONS

Patil, et al., "Don't Forget the Past: Recurrent Depth Estimation from Monocular Video", arXiv:2001.02613, Jan. 8, 2020.
(Continued)

*Primary Examiner* — Ping Y Hsieh
(74) *Attorney, Agent, or Firm* — Seyfarth Shaw LLP (57) ABSTRACT

A method for estimating depth is presented. The method includes generating, at each decoding layer of a neural network, decoded features of an input image. The method also includes upsampling, at each decoding layer, the decoded features to a resolution of a final output of the neural network. The method still further includes concatenating, at each decoding layer, the upsampled decoded features with features generated at a convolution layer of the neural network. The method additionally includes sequentially receiving the concatenated upsampled decoded features at a long-short term memory (LSTM) module of the neural network from each decoding layer. The method still further includes generating, at the LSTM module, a depth estimate of the input image after receiving the concatenated upsampled inverse depth estimate from a final layer of a decoder of the neural network. The method also includes controlling an action of an agent based on the depth estimate.

20 Claims, 8 Drawing Sheets

(56) References Cited

U.S. PATENT DOCUMENTS

2021/0272247 A1* 9/2021 Ryan ................. H04N 5/23232

OTHER PUBLICATIONS

Lee, et al., "From Big to Small: Multi-Scale Local Planar Guidance for Monocular Depth Estimation", arXiv: 1907-10326, Aug. 26, 2019.
Xu, et al., "Multi-scale Continuous CRFs as Sequential Deep Networks for Monocular Depth Estimation", 2017 IEEE Conference on Computer Vision and Pattern Recognition (CVPR), Jul. 21-26, 2017.

* cited by examiner

MULTI-SCALE RECURRENT DECODER FOR MONOCULAR DEPTH ESTIMATION

BACKGROUND

Field

Certain aspects of the present disclosure generally relate to a recurrent decoder for depth estimation systems.

Background

Autonomous agents (e.g., vehicles, robots, etc.) rely on machine vision for constructing a three-dimensional (3D) representation of a surrounding environment. The 3D representation may be used for various tasks, such as localization and/or autonomous navigation. The 3D representation accuracy improves the autonomous agent's ability to perform various tasks. It is desirable to improve the accuracy of a 3D representation constructed from one or more images captured by the autonomous agent.

SUMMARY

In one aspect of the present disclosure, a method for generating a depth map is disclosed. The method includes generating, at each decoding layer of a neural network, decoded features of an input image. The method also includes upsampling, at each decoding layer, the decoded features to a resolution of a final output of the neural network. The method further includes concatenating, at each decoding layer, the upsampled decoded features with features generated at a convolution layer of the neural network. The method still further includes sequentially receiving the concatenated upsampled decoded features at a long-short term memory (LSTM) module of the neural network from each decoding layer. The method also includes generating, at the LSTM module, a depth estimate of the input image after receiving the concatenated upsampled inverse depth estimate from a final layer of a decoder of the neural network. The method further includes controlling an action of an agent based on the depth estimate.

In another aspect of the present disclosure, a non-transitory computer-readable medium with non-transitory program code recorded thereon is disclosed. The program code is for generate a depth map. The program code is executed by a processor and includes program code to generate, at each decode layer of a neural network, decoded features of an input image. The program code also includes program code to upsample, at each decode layer, the decoded features to a resolution of a final output of the neural network. The program code further includes program code to concatenate, at each decode layer, the upsampled decoded features with features generated at a convolution layer of the neural network. The program code still further includes program code to sequentially receive the concatenated decoded features at a long-short term memory module of the neural network from each decode layer. The program code also includes program code to generate, at the LSTM module, a depth estimate of the input image after receive the concatenated upsampled inverse depth estimate from a final layer of a decoder of the neural network. The program code further includes program code to control an action of an agent based on the depth estimate.

Another aspect of the present disclosure is directed to an apparatus. The apparatus have a memory, one or more processors coupled to the memory, and instructions stored in the memory. The instructions bee operable, when executed by the processor, to cause the apparatus to generate, at each decode layer of a neural network, decoded features of an input image. The instructions also cause the apparatus to upsample, at each decode layer, the decoded features to a resolution of a final output of the neural network. The instructions additionally cause the apparatus to concatenate, at each decode layer, the upsampled decoded features with features generated at a convolution layer of the neural network. The instructions further cause the apparatus to sequentially receive the concatenated upsampled decoded features at a long-short term memory module of the neural network from each decode layer. The instructions still cause the apparatus to generate, at the LSTM module, a depth estimate of the input image after receive the concatenated upsampled inverse depth estimate from a final layer of a decoder of the neural network. The instructions still yet further cause the apparatus to control an action of an agent based on the depth estimate.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may generate a 3D representation of a scene based on one or more images obtained from a sensor. The 3D representation may also be referred to as a 3D model, a 3D scene, or a 3D map. 3D representations may facilitate various tasks, such as scene understanding, motion planning, and/or obstacle avoidance. For example, the agent may autonomously navigate through an environment based on the 3D representation.

An artificial neural network generates the 3D representation based on depth estimates. For example, a depth network may be trained to estimate depth from one or more sensor measurements. Conventional scene construction systems generate 3D representations based on hand-engineered features. The images may be captured by a monocular camera and a depth network may be trained to estimate depth via labeled data (e.g., supervised training).

Deep learning approaches, such as self-supervised learning, may eliminate hand-engineered features (e.g., labeled data) and improve 3D model reconstruction. For example, deep learning approaches improve reconstruction of textureless regions and/or geometrically under-determined regions. Aspects of the present disclosure are directed to improving a training stage for a depth estimation network, such as a monocular depth estimation network. Aspects of the present disclosure may improve a convergence speed and final performance of the depth estimation network.

Figure 1:
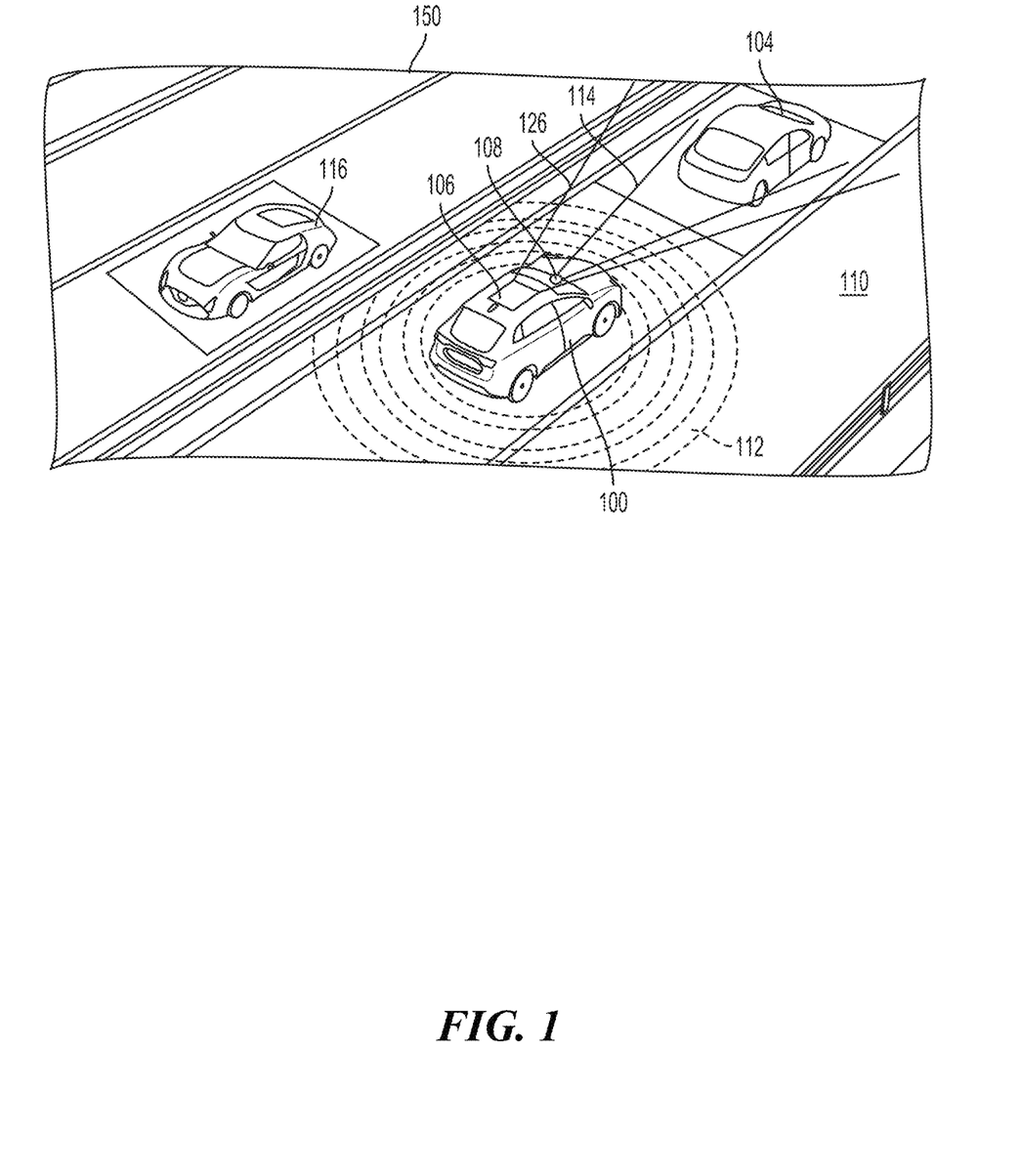
FIG. 1 illustrates an example of a vehicle in an environment according to aspects of the present disclosure.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used to generate a 3D representation of an environment.

As discussed, conventional systems use one or more sensors, such as LIDAR, to build 3D representations of a local environment. LIDAR sensors improve performance in various situations, such as high-dynamic range. Additionally, LIDAR sensors provide reliable and accurate range data at large distances. A LIDAR sensor may be used for a variety of applications, such as mapping, localization, object detection, and collision avoidance.

Still, due to their cost, LIDAR sensors may not be economically viable. Additionally, a LIDAR sensor's 3D reconstruction may be sparse. Cameras, such as a red-green-blue (RGB) camera, may provide a dense texture information and a spatial understanding of the scene by reasoning across space and time. Additionally, cameras may be more economically viable in comparison to LIDAR sensors.

Aspects of the present disclosure are directed to system for training and using a depth network to build 3D representation from one or more images captured by a single camera. In one configuration, the self-supervised training for image-based depth estimation leverages geometric constraints inherent in robots.

In one configuration, depth and ego-motion are estimated from monocular camera imagery. Aspects of the present disclosure improve monocular depth estimates generated from a depth network trained in a self-supervised manner. Improved monocular depth estimates bridge a gap between LIDAR and vision solutions, such that cameras may augment, complement, or substitute range sensors.

The bridged gap may reduce costs and increase robust solutions, since cameras compliment the functions of range sensors. For example, in comparison to a LIDAR sensor, a camera may function better in some environments, such as a rainy environment. In contrast, in comparison to the camera, the LIDAR sensor may function better in other environments, such as low-light conditions. Therefore, monocular depth estimates may improve an agent's ability to perform various tasks.

Furthermore, agents may produce a greater amount of image data in comparison to LIDAR data. The image data may be used as training data for a depth network. As such, the use of a monocular sensor may increase an amount of training data, thereby improving self-supervised monocular depth estimates.

In the current disclosure, unless otherwise noted, a self-supervised monocular depth network refers to a depth network trained in a self-supervised manner to generate a 3D representation from a single-camera. Self-supervised training refers to learning from raw input data without any ground-truth information. The self-supervised monocular depth network may also be referred to as a self-supervised single-camera depth network. The self-supervised monocular depth network may recover depth if a camera's motion is estimated between timesteps (e.g., frames).

In contrast, supervised monocular depth network learns an estimation function by regressing input images to estimated depth outputs. Supervised training refers to learning from labeled ground-truth information. For example, supervised monocular depth networks may use ground truth depth (e.g., LIDAR data) to train a neural network as a regression model. As such, the monocular depth network does not estimate the camera's motion during supervised training.

In a supervised depth network, a convolutional neural networks generates an initial coarse prediction and refines the prediction using another neural network to produce more accurate results. As supervised techniques for depth estimation advance, the availability of target depth labels is reduced due to the costs of generating labeled data. For example, labeling outdoor scenes is a time consuming task.

Thus, some conventional depth networks are trained with stereo cameras to mitigate the need for ground-truth depth labels. In a stereo-camera setting, a baseline distance between two cameras is known and fixed. Therefore, a stereo-camera depth network may estimate depth without estimating the camera's motion between timesteps.

Dynamic objects present a challenge for self-supervised monocular depth networks. Conventional photometric loss determined during training assumes a static world because the network assumes the camera's own motion (ego-motion) is the only source of motion. A pose network may learn the ego-motion. In real-world scenarios, the world is not static. Dynamic objects, such as pedestrians and other vehicles, may pose a safety threat to the ego agent. Therefore, it is desirable to account for dynamic objects when generating a 3D representation of an environment.

Conventional depth networks address dynamic objects by masking out the dynamic objects or learning motion models for the dynamic objects. For example, a conventional depth network may obtain semantic or instance segmentation from another pre-trained network to generate a mask. However, the depth and pose networks cannot learn from masked out objects, thereby reducing model accuracy. Additionally, semantic or instance masks are learned via supervised training, which is in contrast to the self-supervised learning of the current disclosure.

Accurate scene reconstruction may improve autonomous navigation through an environment. Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

Conventional neural networks, such as a depth estimation neural network, may rely on single scale learning, multi-scale learning, or progressive scale learning when training a neural network. The scale may refer to a scaling factor for scaling (e.g., up-sampling) data at a decoding stage. For example, a feature map may be up-sampled at each decoding stage.

During training, a training loss may be applied to one or more layers to update weights and/or other parameters. The applied loss minimizes an error between an estimation and a ground-truth representation. That is, the applied loss may optimize a layer and/or an output of the neural network.

For single scale learning, a loss may only be applied to a final full resolution output. That is, optimization may be limited to the full resolution output. Limiting the optimization to the full resolution output increases network complexity, which results in increased training time.

In some cases, conventional systems are trained to decode dense information via multi-scale learning, where each decoding stage up-samples a feature map (e.g., spatial information). The up-sampled resolution is less than a final output resolution. For example, each decoding stage may have a scale factor of two, such that a size of the spatial information is doubled at each decoding stage.

In multi-scale learning, the training loss is applied to each scale to improve an accuracy of the generated decoding features. Improving the accuracy of decoding features generated at lower levels improves an accuracy of upper levels. Multi-scale learning reduces training time and may enable convergence in deeper networks. Still, multi-scale learning reduces upper layer performance. Specifically, the lower layers are optimized and contribute to the training loss. Still, because the lower layers are not used at inference time, the process of training the lower layers dilutes the performance of the upper layers.

Progressive scaling may be considered a combination of multi-scale and single scale learning. For progressive scaling, multiple scales are initially learned and the number of scales incrementally decreases until a final scale remains. Progressive scaling produces a drift in intermediate scales, because the loss is not applied to the intermediate scales. Additionally, similar to single scale learning, the loss is applied to the final output. Thereby increasing training time.

Aspects of the present disclosure are directed to improving a process for obtaining monocular depth estimations as well as improving a training process for monocular depth estimation systems. In one configuration, a decoder architecture is proposed for improving convergence speed, improving training time, and improving estimation accuracy. The decoder may leverage recurrent modules to incrementally transfer information from lower scales to upper scales.

Generally, neural networks for dense regression or classification include an encoder and a decoder. The encoder decreases the spatial dimensions of the input while generating increasingly abstract features. The decoder increases the spatial dimensions while reconstructing the input. That is, the output of the decoder is the reconstructed input of the neural network.

For example, an encoder for a depth estimation network generates features from an input image. The features may include edges, lines, and geometric shapes. The decoder generates pixel-wise depth estimates based on features received from the encoder. A depth map of the input image may be generated based on the depth estimates. The depth map has the same spatial dimensions as the input image.

In one configuration, a depth estimation network is trained to estimate depth via recurrent modules. Each lower-resolution layer may be a hidden state to initialize a subsequent layer. Recurrent models, such as a long-short term memory (LSTM) network, may model temporal contexts. Specifically, recurrent models propagate sequential information between timesteps.

For example, a recurrent model may process neural language or analyze a sequence of frames. In one example, given a sequence of words, the recurrent model predicts a subsequent word in the sequence. As another example, given a sequence of frames, the recurrent model predicts a subsequent frame of the sequence of frames.

In one configuration, a recurrent model (e.g., LSTM) is specified for modeling the multi-scale learning of dense depth predictions. In this configuration, the lowest scale is used as an initial timestep. Additionally, the lowest scale may be upsampled and used as the initial state for the next scale. The process may continue until the last scale (e.g., a final output) is estimated. The loss may be applied to the last scale. The accuracy of the estimation may be improved because the last scale is the estimate used during inference. Additionally, accuracy may be further improved because the intermediate scales are also trained. Accuracy may be measured by one or more of absolute error, mean squared error and root mean squared error. These intermediate scales serve as states for the last scale.

Figure 2:
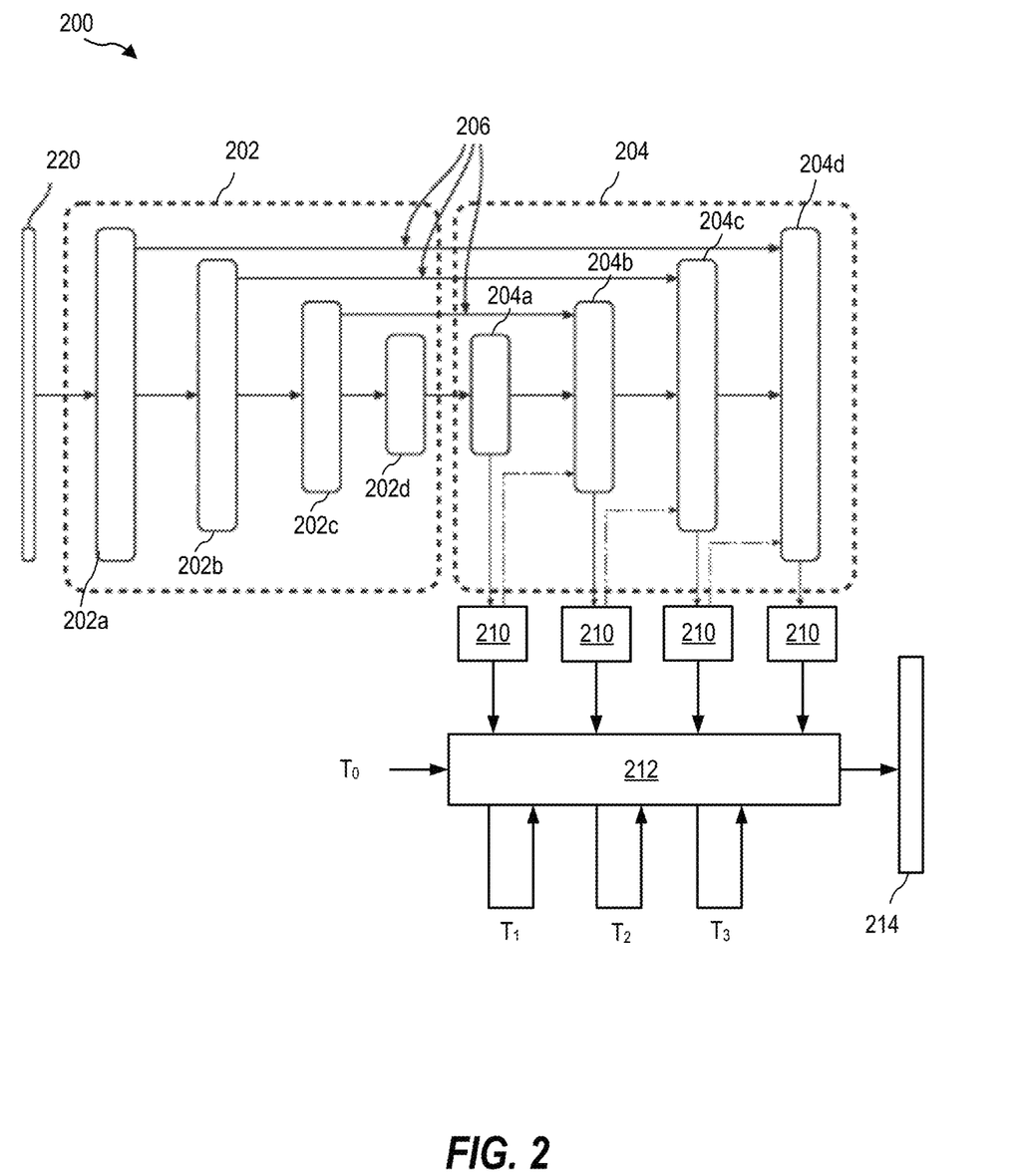
FIG. 2 illustrates an example of an encoder and a decoder for a neural network according to aspects of the present disclosure.

FIG. 2 illustrates an example of a depth network 200 according to aspects of the present disclosure. As shown in FIG. 2, the depth network 200 includes an encoder 202 and a decoder 204. The depth network 200 generates a per-pixel depth map, such as the depth map 560 of FIG. 5C, of an input image 220.

The encoder 202 includes multiple encoder layers 202a-d. Each encoder layer 202a-d may be a packing layer for downsampling features during the encoding process. The decoder 204 includes multiple decoder layers 204a-d. In FIG. 2, each decoder layer 204a-d may be an unpacking layer for upsampling features during the decoding process. That is, each decoder layer 204a-d may unpack (e.g., decode) a received feature map.

Skip connections 206 transmit activations and gradients between encoder layers 202a-d and decoder layers 204a-d. The skip connections 206 facilitate resolving higher resolution details. For example, a gradient may be directly back-propagated to layers via the skip connections 206, thereby improving training. Additionally, the skip connections 206 directly transmit image details (e.g., features) from encoder layers 202a-d to decoder layers 204a-d, thereby improving image recovery at higher resolutions.

The decoder layers 204a-d may generate intermediate inverse depth maps 210. Each intermediate inverse depth map 210 may be upsampled before being concatenated with a corresponding skip connection 206 and feature maps unpacked by a corresponding decoder layer 204a-d. The intermediate inverse depth maps 210 also serve as the output of the depth network from which the loss is calculated. In contrast to conventional systems that incrementally super-resolve each inverse depth map 210. Aspects of the present disclosure upsample each intermediate inverse depth map 210 to a full resolution (for example, a resolution of an output of the decoder 204) using bilinear interpolation. Upsampling to the full resolution reduces copy-based artifacts and photometric ambiguity, thus improving depth estimates.

In one configuration, an LSTM network 212 receives each upsampled inverse depth map 210 from each decoder layer 204a-d. The inverse depth maps 210 may be a combination of an upsampled output of the decoder layer 204a-d and an output of a convolutional layer with a kernel size of one. The convolutional layer produces features with a same number of channels as a final inverse depth prediction 214. To serve as an input to the LSTM network 212, each inverse depth map 210 may have a same number of channels as the final layer decoder layer 204d. The inverse depth maps 210 may be upsampled to have a same resolution as a resolution of the final layer decoder layer 204d. In one configuration, the inverse depth map 210 is upsampled via nearest neighbor interpolation.

The LSTM network 212 is initialized ($T_0$) with an empty state (e.g., all zeros). After initialization, the LSTM network 212 receives, as a sequential input, each inverse depth map 210. From each received inverse depth maps 210, the LSTM network 212 produces an intermediate output and the intermediate states ($T_1$-$T_3$). Each intermediate state is used by the LSTM network 212 along with the inverse depth map 210 from a subsequent decoder layer. The process continues until the LSTM network 212 receives the output of the final decoder layer 204d. The process ends with the LSTM network 212 generating the final inverse depth prediction 214.

As discussed, the LSTM network 212 preserve information between timesteps by incorporating different gates that improve the flow of gradient information. Aspects of the present disclosure are not limited to an LSTM network 212. Other recurrent networks may be used, such as a gated recurrent network (GRU), a recurrent network with a hyperbolic tangent (RNN-TANH), or recurrent network with rectified linear units (RNN-RELU).

As shown in FIG. 2, the LSTM network 212 receives a current state and generates as output a prediction and the next state. In the first iteration, the current state is initialized as zero. In the following iterations, the output next state is used as the current state, generating new predictions which are input to the following next state. The process repeats until an output is generated from the last iteration.

The LSTM network 212 includes an LSTM functional block having multiple nonlinear activation gates along with further functional elements. In general, the LSTM functions to determine temporal information (e.g., relationships) between a sequence of inputs. By implementing the LSTM network 212, long term dependencies in an input sequence (e.g., the signal images) can be maintained throughout the analysis without loss of information.

As described above, the LSTM network 212 outputs an inverse depth estimate from a single image of a scene. The inverse depth represents an object's distance d from the camera as proportional to 1/d. Filtering approaches assume that an error associated with features is Gaussian. In conventional systems, for features that are distant from the camera, the error distribution may not be properly modeled via a Gaussian distribution). By representing the inverse depth the error may be Gaussian. Furthermore, the inverse depth estimates provides for estimating distant points in a scene.

Figure 3:
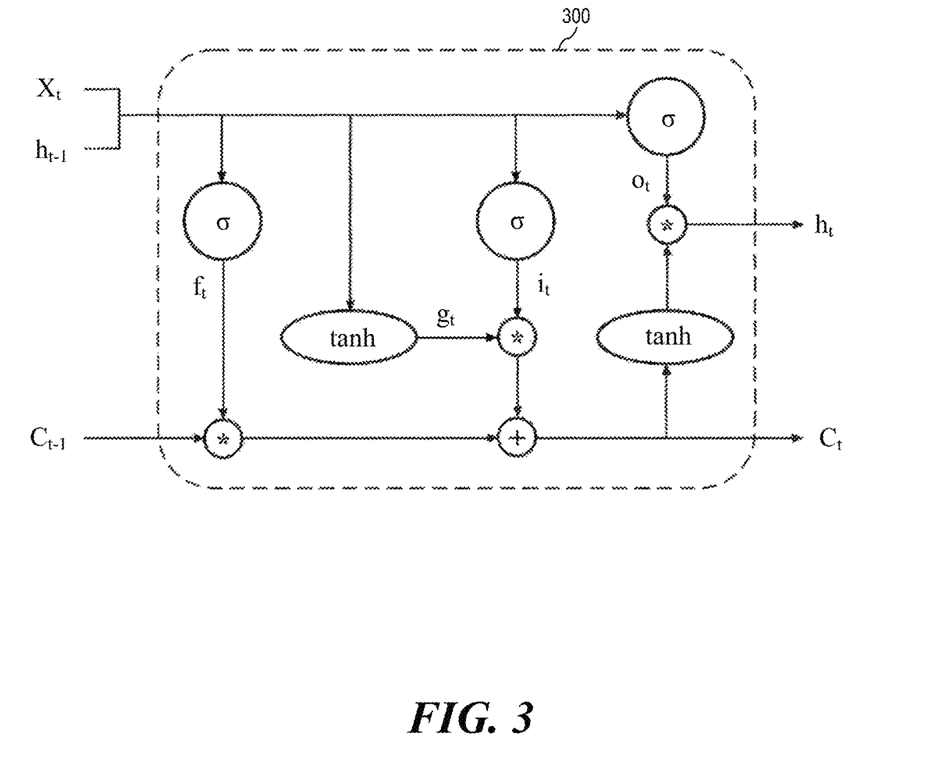
FIG. 3 illustrates an example of a long short term memory block according to aspects of the present disclosure.

FIG. 3 illustrates an example of an LSTM functional block 300 according to aspects of the present disclosure. As shown in FIG. 3, the LSTM functional block 300 accepts inputs of $X_t$, $h_{t-1}$, and $C_{t-1}$. $X_t$ represents the inverse depth map 210 at time t. The input $h_{t-1}$ is a hidden unit from a previous time step. Furthermore, at each subsequent time step (e.g., each iteration of the LSTM functional block 300), the LSTM functional block 300 estimates the hidden unit $h_t$, which is provided to a next iteration as the input $h_{t-1}$.

The LSTM functional block 300 also receives stored information of a memory cell $C_{t-1}$ that holds information from a previous iteration. The memory cell is updated at each iteration with newly calculated information and passed to a next iteration. As illustrated in FIG. 3, the LSTM functional block 300 includes different gates. In one configuration, the LSTM functional block 300 includes a forget gate $f_t$ to determine what to discard from $x_t$ and $h_{t-1}$. The forget gate $f_t$ is a sigmoid function ($\sigma$), which, for example, outputs values from 0 to 1 and performs element-wise product with information of the previous memory cell state $C_{t-1}$ to determine what information to discard or to keep.

Additionally, input gate $i_t$ updates information to the memory cell $C_t$ and the hyperbolic tangent (tan h) layer $g_t$. The gates $i_t$ and $g_t$ control what to remember from $x_t$ and $h_{t-1}$, and add to the values to provide the memory cell $C_t$ for a next iteration. In addition to updating the memory cell $C_t$, the LSTM functional block 300 also determines the hidden state $h_t$ at each iteration. An output gate of is computed and weighted with the memory cell state $C_t$ via tanh.

For monocular depth estimation, each decoder layer progressively generates features with higher spatial dimensions. For example, the initial decoder layer may generate features with H/16×W/16 dimensions, where H is a height and W is a width of the input image. The subsequent layers may generate features with the following dimensions: H/8×W/8; H/4×W/4; H/2×W/2; and H×W.

Figure 4:
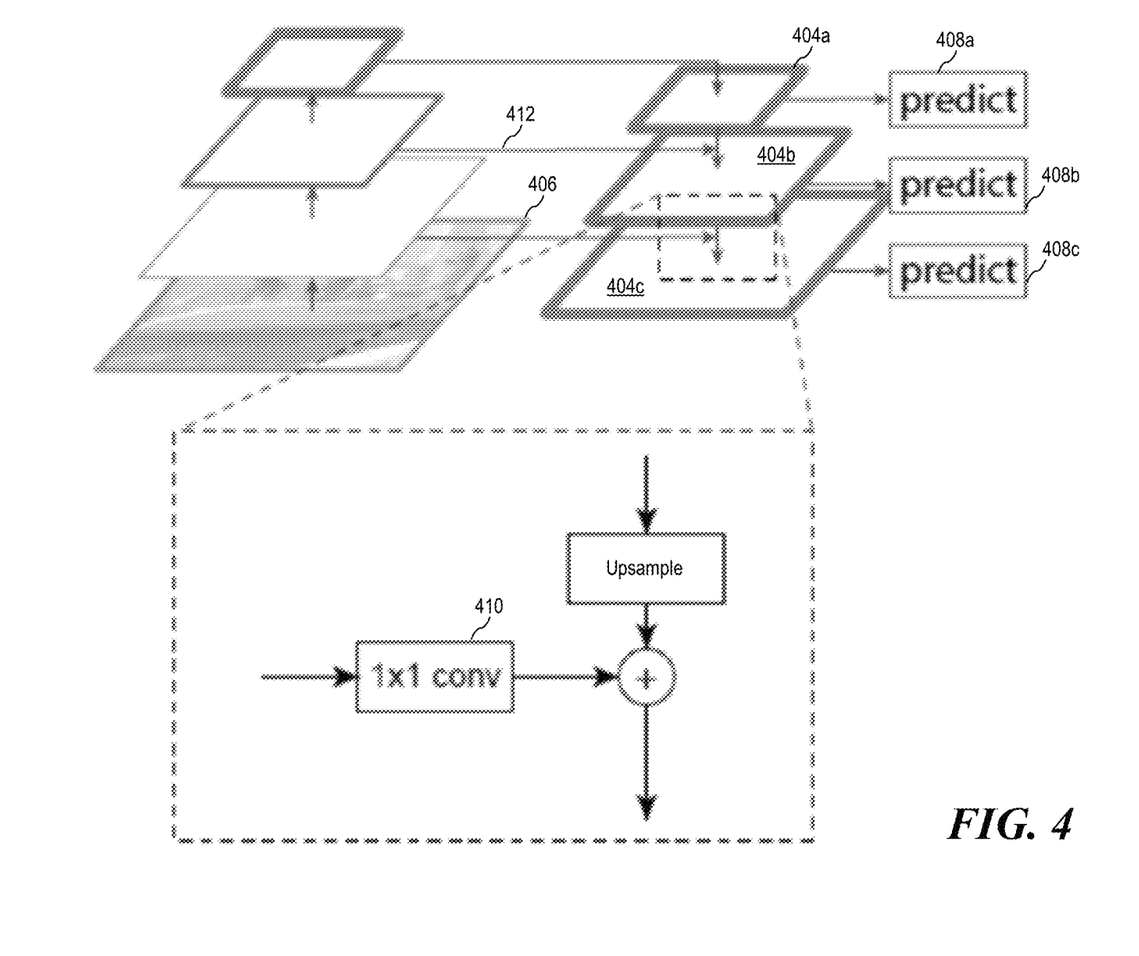
FIG. 4 illustrates an example of an encoder and a decoder according to aspects of the present disclosure.

FIG. 4 illustrates an example of an encoder and a decoder according to aspects of the present disclosure. For brevity, the encoder and decoder are shown with three layers, additional layers may be used. In the example of FIG. 4, the dimensions of the features output from a third decoder layer 404a may be H/4×W/4, where H is a height and W is a width of the input image 406. The dimensions of the features from the second layer 404b may be H/2×W/2 and the dimensions of the features from the first layer 404c may be H×H. For example, if the dimensions of the input image 406 are 256×256, the dimensions of the feature from the third decoder layer 404a are 64×64 (e.g., (256/4)×(256/4)).

The features from each decoder layer 404a-c may produce inverse depth estimates 408a-c. The dimensions of each inverse depth estimate 408a-c are the same as the dimensions of a corresponding feature. For example, the inverse depth estimate generated 408a from the features of the third decoder layer 404a are H/8×W/8. As shown in FIG. 4, the features from a decoder layer 404a-c may be upsampled and concatenated with an output of a convolutional layer (e.g., encoder layer). The output of the convolutional layer may be received via a skip connection 206.

The training loss may be applied to each decoder layer 404a-c. The weight of the training loss may be uniform. Alternatively, the weight of the training loss may exponentially decrease. For example, a weight for a fourth layer (not shown in FIG. 4) may be divided by eight, a weight for a third layer 404a may be divided by four, a weight for a second layer 404b may be divided by four, and a weight for a first layer 404c is not divided.

Figure 5A:
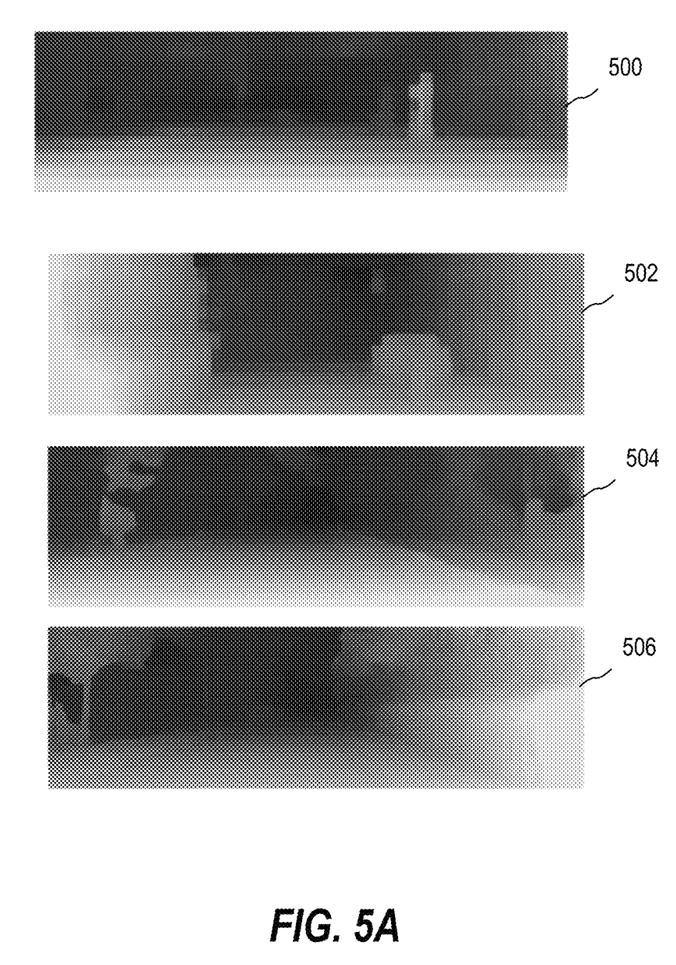
FIG. 5A illustrates examples of different iterations of estimates of a depth decoder according to aspects of the present disclosure.

FIG. 5A illustrates examples of different iterations of depth estimates 500, 502, 504, 506 from a depth decoder according to aspects of the present disclosure. The depth estimates 500, 502, 504, 506 may be generated by the depth network 200 as described in FIG. 2. As described above, features from each timestep (decoder layer) are upsampled to the full resolution before serving as input for an LSTM block, such as the LSTM network 212 as described in FIG. 2. Lower layers (e.g., deeper layers) are upsampled to a greater extent in comparison to the upper layers because the lower layers generate features with lower resolution. As such, estimates of the lower layers may be blocky in comparison to estimates of upper layers.

For example, as shown in FIG. 5A, the first and second estimates 500, 502 may be generated by lower layers. Additionally, a third estimate 504 and a fourth estimate 506 may be generated by upper layers. In this example, the first and second estimates 500, 502 are more blocky in comparison to the third and fourth estimates 504, 506.

A training session using the proposed recurrent decoder has a faster converge rate (e.g., reaching lower values faster) in comparison to conventional networks. Additionally, the proposed recurrent decoder may improve performance (for example, reduce mean absolute error, mean squared error, root mean squared error) at the end of the training session.

The trained depth decoder may be implemented for a variety of tasks, such as scene reconstruction. For scene reconstruction, a pose and a depth are estimated based on a two-dimensional target image and one or more previous images in a sequence of images. Based on the estimated pose and depth, a scene reconstruction network may generate a three-dimensional (3D) reconstruction of the target image.

Figure 5B:
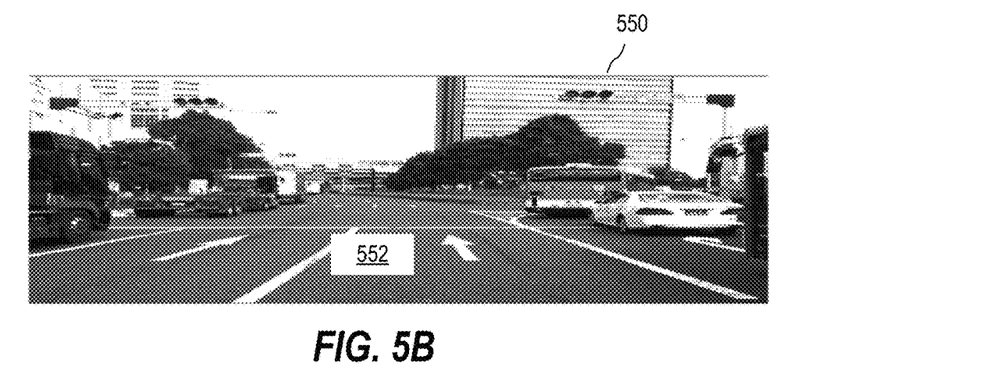
FIG. 5B illustrates an example of a two-dimensional image of a scene according to aspects of the present disclosure.

FIG. 5B illustrates an example of a target image 550 of a scene 552 according to aspects of the present disclosure. The target image 550 may be captured by a monocular camera. The monocular camera may capture a forward-facing view of an agent (e.g., a vehicle), such as the ego vehicle 100 or vehicle 638 as described in FIGS. 1 and 6. In one configuration, the monocular camera is integrated with the vehicle. For example, the monocular camera may be defined in a roof structure, windshield, grill, or other portion of the vehicle. The vehicle may have one or more cameras and/or other types of sensors. The target image 550 may also be referred to as a current image. The target image 550 captures a 2D representation of a scene.

Figure 5C:
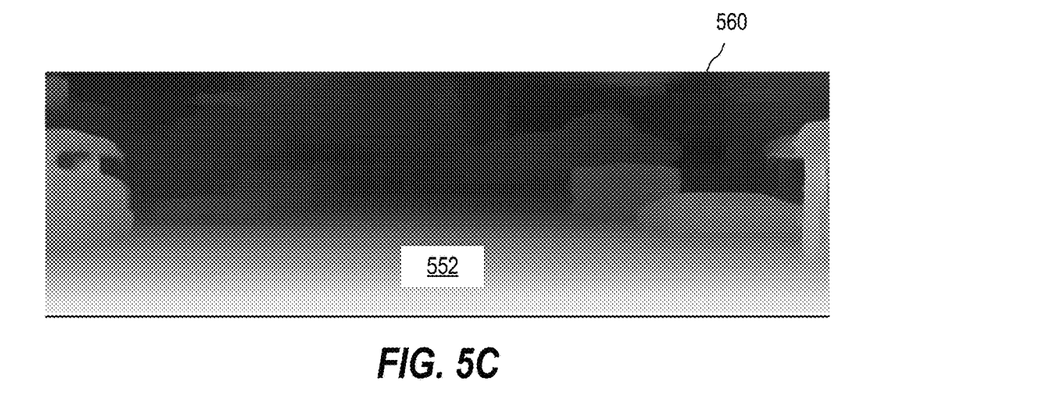
FIG. 5C illustrates an example of a depth map of a scene according to aspects of the present disclosure.

FIG. 5C illustrates an example of a depth map 560 of the scene 552 according to aspects of the present disclosure. The depth map 560 may be estimated from the target image 550 and one or more source images. The depth map 560 may be generated by the depth network 200 as described in FIG. 2. The source images may be images captured at a previous time step in relation to the target image 550. The depth map 560 provides a depth of a scene. The depth may be represented as a color or other feature.

Figure 5D:
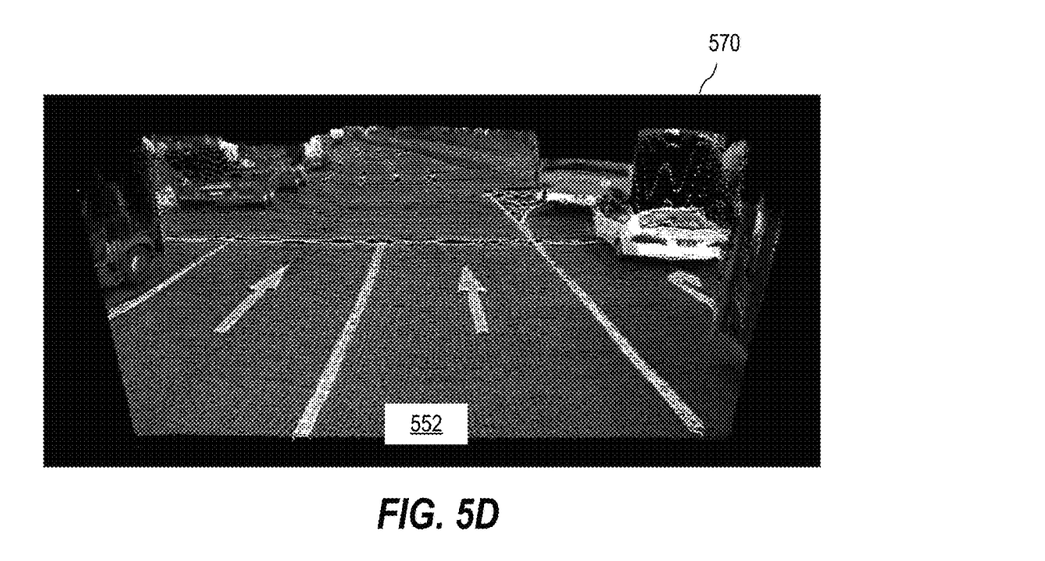
FIG. 5D illustrates an example of a three-dimensional (3D) reconstruction of a scene according to aspects of the present disclosure.

FIG. 5D illustrates an example of a 3D reconstruction 570 of the scene 552 according to aspects of the present disclosure. The 3D reconstruction may be generated from the depth map 560 as well as a pose of the target image 550 and a source image. The pose refers to the ego-motion of the agent, such as the ego vehicle 100 or the vehicle 628 as described with reference to FIGS. 1 and 6. As shown in FIGS. 2A and 2C, the viewing angle of the scene 552 of the 2D target image 550 is different from a viewing angle of the scene 552 in the 3D reconstruction 570. Because the 3D reconstruction 570 is a 3D view of the scene 552, the viewing angle may be changed as desired. The 3D reconstruction 570 may be used to control one or more actions of the agent.

Aspects of the present disclosure are not limited to using the depth decoder for depth estimate of a scene reconstruction system. The depth decoder may be used for other tasks performed by various agents.

Figure 6:
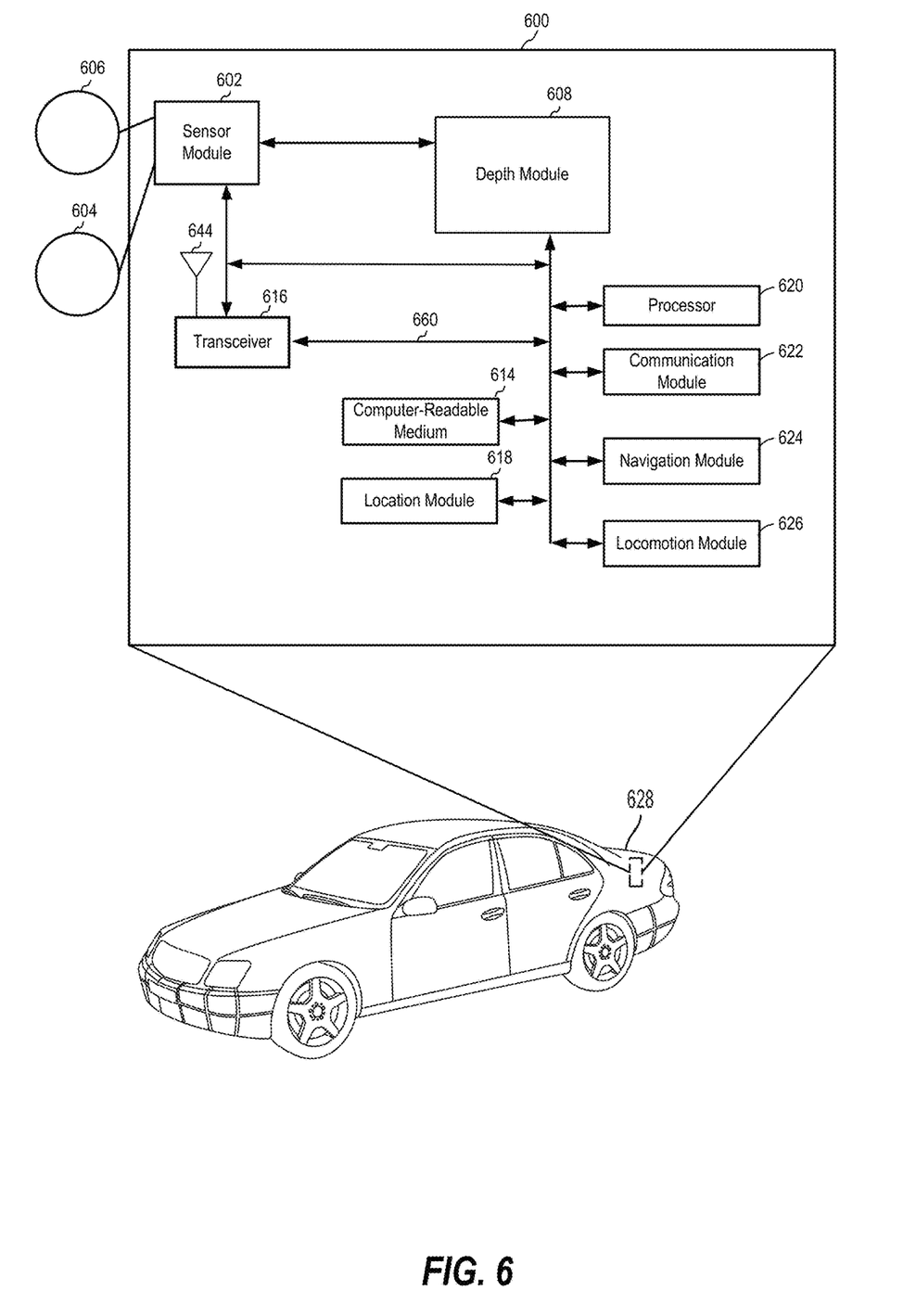
FIG. 6 is a diagram illustrating an example of a hardware implementation for a depth estimation system, in accordance with aspects of the present disclosure.

FIG. 6 is a diagram illustrating an example of a hardware implementation for a depth estimation system 600, according to aspects of the present disclosure. The depth estimation system 600 may be a component of a vehicle, a robotic device, or another device. For example, as shown in FIG. 6, the depth estimation system 600 is a component of a vehicle 628, which may be an example of the ego vehicle 100 described with reference to FIG. 1. Aspects of the present disclosure are not limited to the depth estimation system 600 being a component of the vehicle 628, as other types of agents, such as a bus, boat, drone, or robot, are also contemplated for using the depth estimation system 600.

The vehicle 628 may operate in one or more of an autonomous operating mode, a semi-autonomous operating mode, and a manual operating mode. Furthermore, the vehicle 628 may be an electric vehicle, a hybrid vehicle, a fuel vehicle, or another type of vehicle.

The depth estimation system 600 may be implemented with a bus architecture, represented generally by a bus 660. The bus 660 may include any number of interconnecting buses and bridges depending on the specific application of the depth estimation system 600 and the overall design constraints. The bus 660 links together various circuits including one or more processors and/or hardware modules, represented by a processor 620, a communication module 622, a location module 618, a sensor module 602, a locomotion module 626, a navigation module 624, and a computer-readable medium 614. The bus 660 may also link various other circuits such as timing sources, peripherals, voltage regulators, and power management circuits, which are well known in the art, and therefore, will not be described any further.

The depth estimation system 600 includes a transceiver 616 coupled to the processor 620, the sensor module 602, a recurrent depth estimation module 608, the communication module 622, the location module 618, the locomotion module 626, the navigation module 624, and the computer-readable medium 614. The transceiver 616 is coupled to an antenna 444. The transceiver 616 communicates with various networks and/or other devices over one or more communication networks, such as an infrastructure network (e.g., LTE, 5G NR), a V2V network, a V2I network, a V2X network, a V2P network, or another type of network.

The depth estimation system 600 includes the processor 620 coupled to the computer-readable medium 614. The processor 620 performs processing, including the execution of software stored on the computer-readable medium 614 providing functionality according to the disclosure. The software, when executed by the processor 620, causes the depth estimation system 600 to perform the various functions described for a particular device, such as the vehicle 628, or any of the modules 602, 608, 614, 616, 618, 620, 622, 624, 626. The computer-readable medium 614 may also be used for storing data that is manipulated by the processor 620 when executing the software.

The sensor module 602 may be used to obtain measurements via different sensors, such as a first sensor 606 and a second sensor 604. The first sensor 606 may be a vision sensor, such as a stereoscopic camera or a red-green-blue (RGB) camera, for capturing 2D images. The second sensor 604 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 604, 606.

The measurements of the first sensor 606 and the second sensor 604 may be processed by one or more of the processor 620, the sensor module 602, the recurrent depth estimation module 608, the communication module 622, the location module 618, the locomotion module 626, the navigation module 624, in conjunction with the computer-readable medium 614 to implement the functionality described herein. In one configuration, the data captured by the first sensor 606 and the second sensor 604 may be transmitted to an external device via the transceiver 616. The first sensor 606 and the second sensor 604 may be coupled to the vehicle 628 or may be in communication with the vehicle 628.

The location module 618 may be used to determine a location of the vehicle 628. For example, the location module 618 may use a global positioning system (GPS) to determine the location of the vehicle 628. The communication module 622 may be used to facilitate communications via the transceiver 616. For example, the communication module 622 may be configured to provide communication capabilities via different wireless protocols, such as WiFi, long term evolution (LTE), 4G, etc. The communication module 622 may also be used to communicate with other components of the vehicle 628 that are not modules of the depth estimation system 600.

The locomotion module 626 may be used to facilitate locomotion of the vehicle 628. As an example, the locomotion module 626 may control a movement of the wheels. As another example, the locomotion module 626 may be in communication with one or more power sources of the vehicle 628, such as a motor and/or batteries. Of course, aspects of the present disclosure are not limited to providing locomotion via wheels and are contemplated for other types of components for providing locomotion, such as propellers, treads, fins, and/or jet engines.

The depth estimation system 600 also includes the navigation module 624 for planning a route or controlling the locomotion of the vehicle 628, via the locomotion module 626. The navigation module 624 may override user input when the user input is expected (e.g., predicted) to cause a collision. The modules may be software modules running in the processor 620, resident/stored in the computer-readable medium 614, one or more hardware modules coupled to the processor 620, or some combination thereof.

The recurrent depth estimation module 608 may be in communication with the sensor module 602, the transceiver 616, the processor 620, the communication module 622, the location module 618, the locomotion module 626, the navigation module 624, and the computer-readable medium 614. In one configuration, the recurrent depth estimation module 608 receives sensor data from the sensor module 602. The sensor module 602 may receive the sensor data from the first sensor 606 and the second sensor 604. According to aspects of the present disclosure, the sensor module 602 may filter the data to remove noise, encode the data, decode the data, merge the data, extract frames, or perform other functions. In an alternate configuration, the recurrent depth estimation module 608 may receive sensor data directly from the first sensor 606 and the second sensor 604.

In one configuration, the recurrent depth estimation module 608 may work in conjunction with one or more of the other modules 602, 608, 614, 616, 618, 620, 622, 624, 626 and/or sensors 604, 606 to perform one or more functions described below. In some examples, the recurrent depth estimation module 608 is configured to perform operations including operations of the process 700 described below with reference to FIG. 7.

In some implementations, the recurrent depth estimation module 608 may include neural network based on an encoder/decoder architecture, such as the depth network 200 as described in FIG. 2. The recurrent depth estimation module 608 may be configured to generate, at each decoding layer of a neural network, decoded features of an input image. Additionally, the recurrent depth estimation module 608 may upsample, at each decoding layer, the decoded features to a resolution of a final output of the neural network. Furthermore, the recurrent depth estimation module 608 may concatenate, at each decoding layer, the upsampled decoded features with features generated at a convolution layer of the neural network.

Still further, in such implementations, the recurrent depth estimation module 608 may sequentially receive the concatenated upsampled decoded features at an LSTM module of the neural network from each decoding layer. Additionally, the recurrent depth estimation module 608 may generate, at the LSTM module, a depth estimate of the input image after receiving the concatenated upsampled inverse depth estimate from a final layer of a decoder of the neural network. Furthermore, the recurrent depth estimation module 608 may control an action of an agent based on the depth estimate.

In some implementations, the recurrent depth estimation module 608 may be also configured for generating a current state output at the LSTM module based on concatenated upsampled decoded features received from an initial decoding layer and an initial state of the LSTM module. In this implementation, the recurrent depth estimation module 608 may be also configured for generating a subsequent current state output based on concatenated upsampled decoded features received from a decoding layer subsequent to the initial decoding layer and the current state output. The initial state may be initialized to zero.

In some implementations, the recurrent depth estimation module 608 may be also configured for receiving the input image from a monocular camera. Additionally, in some implementations, the concatenated upsampled decoded features have a same number of channels as the depth estimate. As described, the vehicle 628 may be an autonomous vehicle or a semi-autonomous vehicle.

Figure 7:
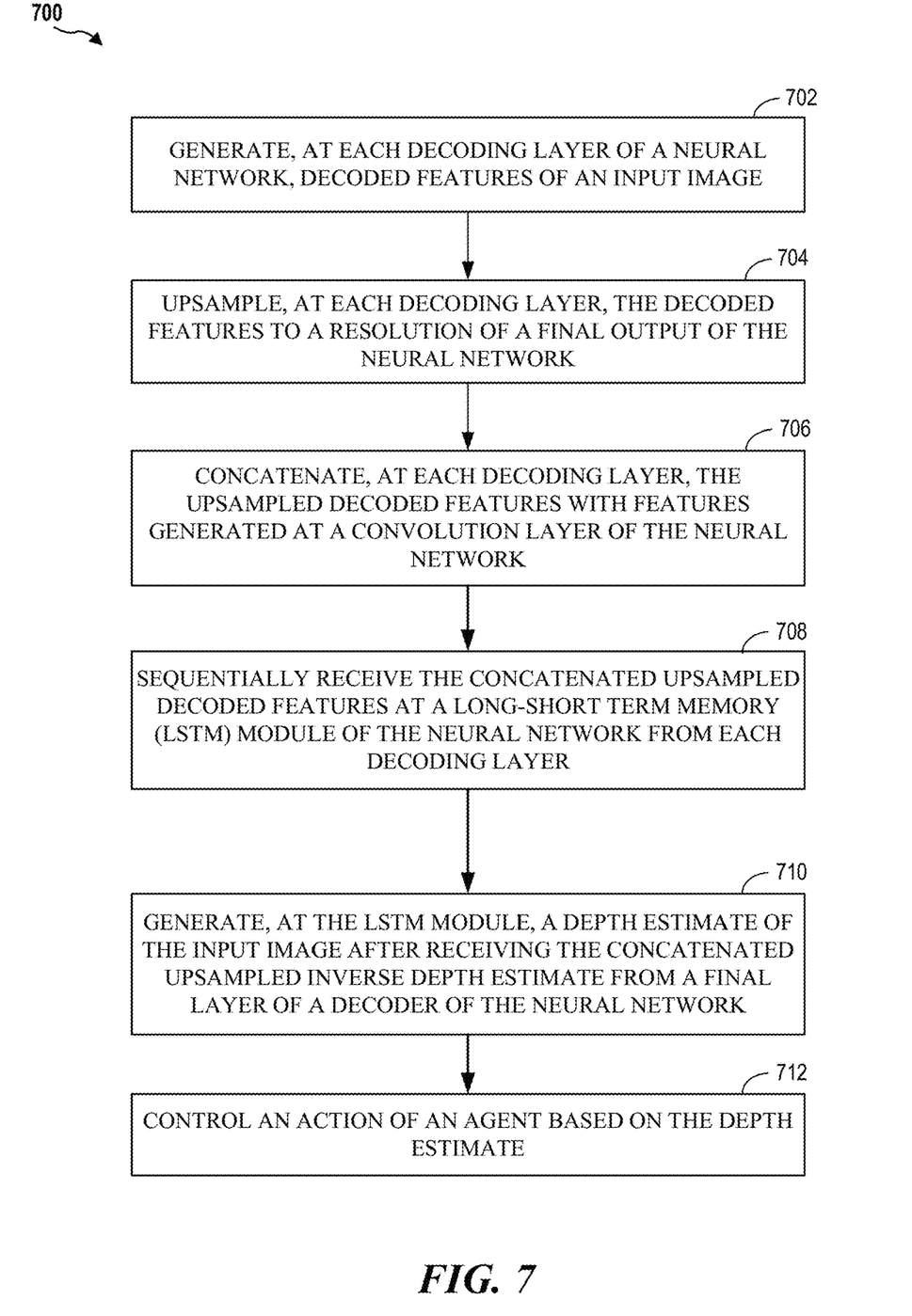
FIG. 7 is a diagram illustrating an example process performed, for example, by an agent [method/estimating depth], in accordance with various aspects of the present disclosure.

FIG. 7 is a diagram illustrating an example process 700 performed, for example, by a depth estimation neural network, such as the depth network 200 or the depth estimation module 608 as described in FIGS. 2 and 6, in accordance with various aspects of the present disclosure. The example process 700 is an example of multi-scale recurrent decoding for monocular depth estimation.

As shown in FIG. 7, in some aspects, the process 700 may include generating, at each decoding layer of a neural network, decoded features of an input image (block 702). The input image may be received from a monocular camera integrated with the agent. In one configuration, the agent is an autonomous vehicle or a semi-autonomous vehicle. As shown in FIG. 7, in some aspects, the process 700 may include upsampling, at each decoding layer, the decoded features to a resolution of a final output of the neural network (block 704).

As shown in FIG. 7, in some aspects, the process 700 may include concatenating, at each decoding layer, the upsampled decoded features with features generated at a convolution layer of the neural network (block 706). The concatenated upsampled decoded features may have a same number of channels as the depth estimate.

As shown in FIG. 7, in some aspects, the process 700 may include sequentially receiving the concatenated upsampled decoded features at a long-short term memory (LSTM) module of the neural network from each decoding layer (block 708). A current state output at the LSTM module may be generated based on concatenated upsampled decoded features received from an initial decoding layer and an initial state of the LSTM module. The initial state may be initilized to zero. Additionally, a subsequent current state output may be generated based on concatenated upsampled decoded features received from a decoding layer subsequent to the initial decoding layer and the current state output.

As shown in FIG. 7, in some aspects, the process 700 may include generating, at the LSTM module, a depth estimate of the input image after receiving the concatenated upsampled inverse depth estimate from a final layer of a decoder of the neural network (block 710). As shown in FIG. 7, in some aspects, the process 700 may include controlling an action of an agent based on the depth estimate (block 712).

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for estimating depth, comprising:
generating, at each decoding layer of a neural network, decoded features of an input image;
upsampling, at each decoding layer, the decoded features to a resolution of a final output of the neural network;
concatenating, at each decoding layer, the upsampled decoded features with features generated at a convolution layer of the neural network;
sequentially receiving the concatenated upsampled decoded features at a long-short term memory (LSTM) module of the neural network from each decoding layer;
generating, at the LSTM module, a depth estimate of the input image after receiving the concatenated upsampled decoded features from a final layer of a decoder of the neural network; and
controlling an action of an agent based on the depth estimate.

2. The method of claim 1, further comprising generating a current state output at the LSTM module based on concatenated upsampled decoded features received from an initial decoding layer and an initial state of the LSTM module.

3. The method of claim 2, further comprising generating a subsequent current state output based on concatenated upsampled decoded features received from a decoding layer subsequent to the initial decoding layer and the current state output.

4. The method of claim 2, in which the initial state is initialized to zero.

5. The method of claim 1, further comprising receiving the input image from a monocular camera.

6. The method of claim 1, in which the concatenated upsampled decoded features have a same number of channels as the depth estimate.

7. The method of claim 1, in which the agent is an autonomous vehicle.

8. An apparatus for estimating depth, comprising:
a processor;
a memory coupled with the processor; and
instructions stored in the memory and operable, when executed by the processor, to cause the apparatus:
to generating, at each decoding layer of a neural network, decoded features of an input image;
to upsample, at each decoding layer, the decoded features to a resolution of a final output of the neural network;
to concatenate, at each decoding layer, the upsampled decoded features with features generated at a convolution layer of the neural network;
to sequentially receive the concatenated upsampled decoded features at a long-short term memory (LSTM) module of the neural network from each decoding layer;
to generate, at the LSTM module, a depth estimate of the input image after receiving the concatenated upsampled decoded features from a final layer of a decoder of the neural network; and
to control an action of an agent based on the depth estimate.

9. The apparatus of claim 8, in which the instructions further cause the apparatus to generate a current state output at the LSTM module based on concatenated upsampled decoded features received from an initial decoding layer and an initial state of the LSTM module.

10. The apparatus of claim 9, in which the instructions further cause the apparatus to generate a subsequent current state output based on concatenated upsampled decoded features received from a decoding layer subsequent to the initial decoding layer and the current state output.

11. The apparatus of claim 9, in which the initial state is initialized to zero.

12. The apparatus of claim 8, in which the instructions further cause the apparatus to receive the input image from a monocular camera.

13. The apparatus of claim 8, in which the concatenated upsampled decoded features have a same number of channels as the depth estimate.

14. The apparatus of claim 8, in which the agent is an autonomous vehicle.

15. A non-transitory computer-readable medium having program code recorded thereon for estimating depth, the program code executed by a processor and comprising:
program code to generating, at each decoding layer of a neural network, decoded features of an input image;
program code to upsample, at each decoding layer, the decoded features to a resolution of a final output of the neural network;
program code to concatenate, at each decoding layer, the upsampled decoded features with features generated at a convolution layer of the neural network;
program code to sequentially receive the concatenated upsampled decoded features at a long-short term memory (LSTM) module of the neural network from each decoding layer;
program code to generate, at the LSTM module, a depth estimate of the input image after receiving the concatenated upsampled decoded features from a final layer of a decoder of the neural network; and
program code to control an action of an agent based on the depth estimate.

16. The non-transitory computer-readable medium of claim 15, in which the instructions further cause the apparatus to generate a current state output at the LSTM module based on concatenated upsampled decoded features received from an initial decoding layer and an initial state of the LSTM module.

17. The non-transitory computer-readable medium of claim 16, in which the instructions further cause the apparatus to generate a subsequent current state output based on concatenated upsampled decoded features received from a decoding layer subsequent to the initial decoding layer and the current state output.

18. The non-transitory computer-readable medium of claim 16, in which the initial state is initialized to zero.

19. The non-transitory computer-readable medium of claim 15, in which the instructions further cause the apparatus to receive the input image from a monocular camera.

20. The non-transitory computer-readable medium of claim 15, in which the concatenated upsampled decoded features have a same number of channels as the depth estimate.

* * * * *